Oct. 17, 1939.   T. M. JONES   2,176,818
APPARATUS FOR COOKING AND COOLING CANNED GOODS
Filed March 11, 1938   2 Sheets-Sheet 1
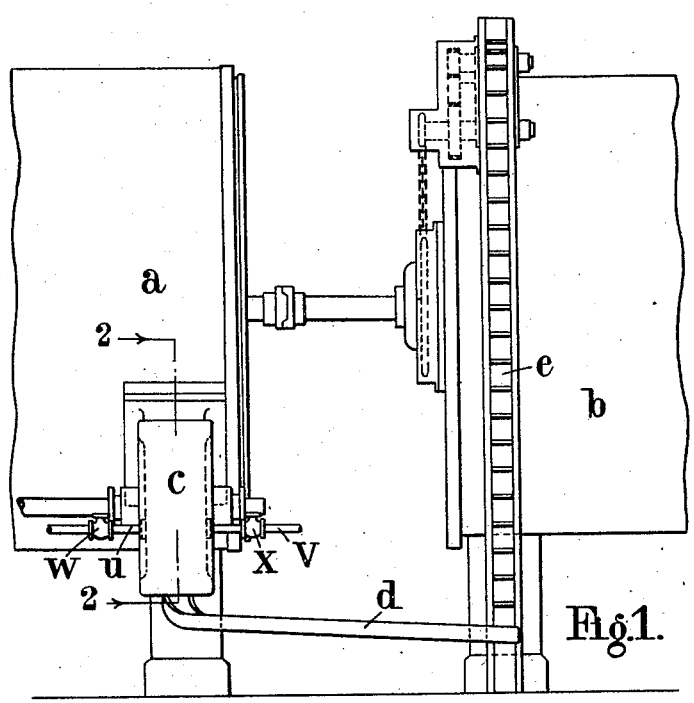
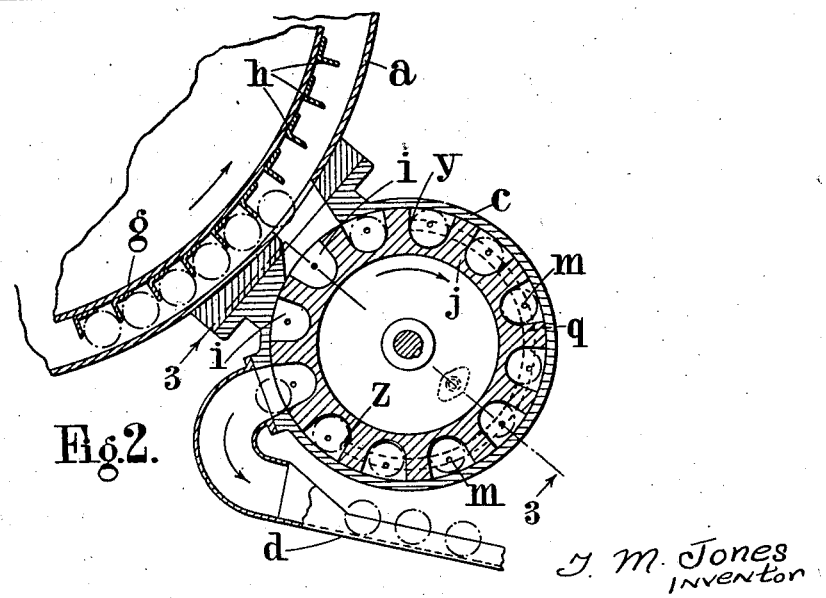

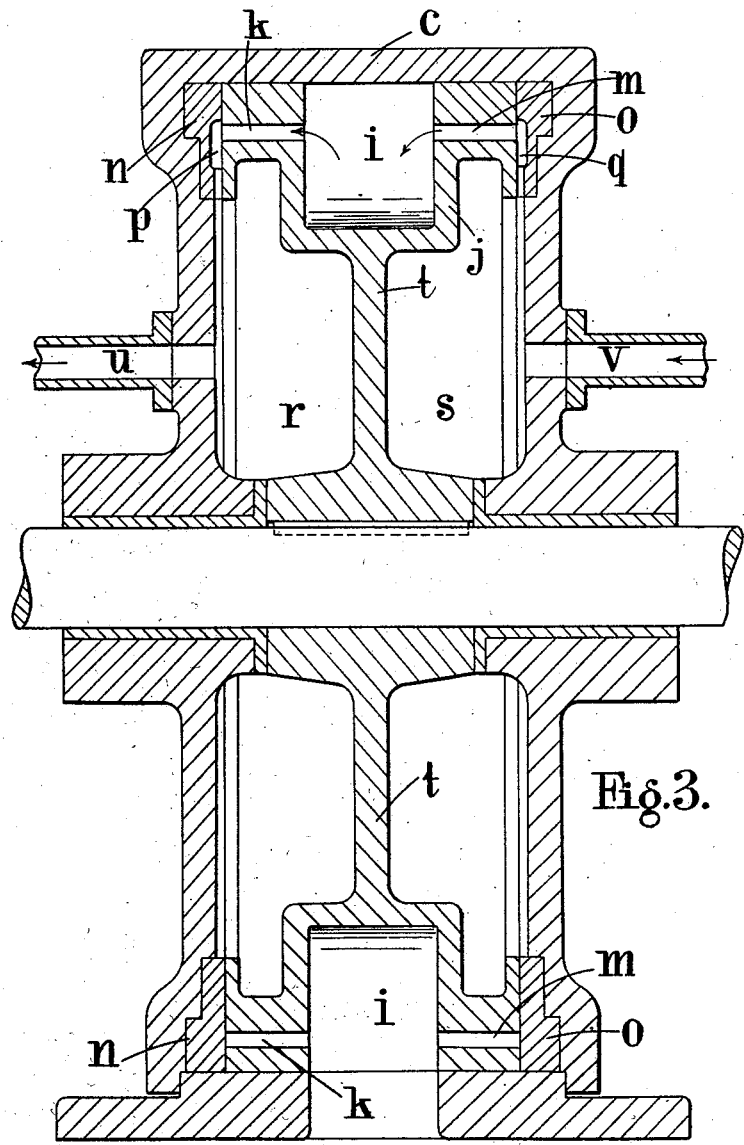

Patented Oct. 17, 1939

2,176,818

UNITED STATES PATENT OFFICE 2,176,818

APPARATUS FOR COOKING AND COOLING CANNED GOODS

Thomas Marsden Jones, Newton Heath, Manchester, England, assignor to Mather & Platt Limited, Newton Heath, Manchester, England, a British company Application March 11, 1938, Serial No. 195,398
In Great Britain April 8, 1937

2 Claims. (Cl. 126—272)

In cooking canned goods temperatures are used which cause a generation of a pressure above atmospheric within the cans and it is important that such pressure shall not cause bulging of the cans when they are removed from the pressure cooker and passed through the cooler. To obviate such bulging, the cooler is maintained under pressure or the cans are passed up a water column so that the external pressure thereon is gradually reduced.

By research and experiment I have found that as the pressure within the can is due to steam formation therein, such pressure can be rapidly lowered by condensing the steam by the application of cooling water to the can, and that when such condensation has been effected, further generation of steam with development of internal pressure is prohibited by the continued cooling action. It follows therefore that only the initial cooling during which the internal pressure is being reduced need take place under pressure to counteract the internal pressure the further cooling being at atmospheric pressure as there is then no liability of the cans bulging. This procedure gives many important advantages for not only does it obviate the necessity for the employment of the relatively costly pressure type coolers, but it obviates also the danger when using a pressure cooler of leakage of the pressure coolants into the can when the latter is no longer under internal pressure but has an external pressure applied thereto.

My invention comprises subjecting the cans whilst in the valve which transfers them from the cooker to the cooler to a pressure and to a cooling action, the cans leaving the valve being thereafter subjected to a further cooling action under atmospheric pressure by which the cooling of the canned goods is completed.

My invention further comprises a rotary valve for transferring cans from a cooker for canned goods, having pockets therein which when they are cut off from the cooker and from the atmosphere, are filled with a coolant under pressure.

Referring to the accompanying explanatory drawings:

Figure 1 is a view showing part of a cooker and part of a cooler, with means for withdrawing the cans from the cooker which have my invention applied thereto or incorporated therein in one convenient form.

Figure 2 is a sectional view on the line 2—2 of Figure 1.

Figure 3 is a sectional view on the line 3—3 of Figure 2 but drawn to a larger scale.

$a$ indicates the cooker, $b$ the cooler, $c$ the casing of the valve by which the cans are withdrawn from the cooker and fed into a chute $d$ from which they are elevated by a conveyor indicated at $e$, and fed into the open cooler $b$.

The cans are carried round the cooker interior upon a revolving drum $g$ having division pieces $h$ upon its periphery between which the cans are moved along the drum in known manner. The cans then fall successively into the pockets $i$ of the revolving valve $j$ and are carried around the interior of the casing $c$ by the valve and finally deposited in the chute $d$ down which they travel to the elevator $e$.

Each pocket $i$ has passages $k$ and $m$ leading from its opposite sides to the side faces of the valve, (see Figure 3) and the outer ends of said passages are closed at one part of the valve casing $c$ by the rings $n$ and $o$ constituting the side walls of the valve, but at the other part of the casing, such passages $k$ and $m$ open into recesses $p$ and $q$ in the rings $n$ and $o$. The recesses $p$ and $q$ communicate with the spaces $r$ and $s$ at the opposite sides of the web $t$ of the valve and such spaces are in communication with the outlet conduit $u$ and the inlet conduit $v$ respectively for the cooling fluid which is to cool the contents of the cans. The cooling fluid is supplied under pressure and valves $w$ and $x$ provided upon the conduits $u$ and $v$ serve to control the fluid flow so that any desired pressure may be maintained in the spaces $r$ and $s$ and so in the pockets which are in communication therewith by way of the passages $p$, $q$, $k$ and $m$.

It will be noted from Figure 2 that the recesses $p$ and $q$ extend around the valve casing from a point $y$ to a point $z$ so that the cooling of the cans under pressure takes place whilst the cans travel from $y$ to $z$. When this initial cooling under pressure has taken place, the cans can be cooled under atmospheric pressure without the liability of the cans bulging due to internal pressure.

The cooler can be a simple form of apparatus wherein the cans pass through cooling water and the use of relatively expensive pressure coolers or water columns to give the necessary external pressure upon the cans is obviated.

I claim:

1. In combination with a cooker for canned material in which a pressure above atmospheric is continuously maintained and a cam cooler in which a lower or atmospheric pressure is maintained, a cooling and transfer device having a fluid tight connection with the cooker and delivering cans to the cooler, said device comprising a valve for transferring cans from the pressure cooker to the cooler at lower or atmospheric pressure, said valve comprising a rotary member having can receiving pockets therein, an inlet channel for loading cans into said can pockets, an outlet channel spaced from said inlet channel for discharging cans from said can pockets, a casing around said rotary member forming a fluid tight joint therewith, and means for introducing a cooling liquid into and maintaining it under pressure in said can pockets during at least a portion of their movement intermediate said can inlet and outlet channels.

2. In combination with a cooker for canned material in which a pressure above atmospheric is continuously maintained and a can cooler in which a lower or atmospheric pressure is maintained, a cooling and transfer device having a fluid tight connection with the cooker and delivering cans to the cooler, said device comprising a valve for transferring cans from the pressure cooker to a cooler at lower or atmospheric pressure said valve comprising a rotary member having can receiving pockets therein, an inlet channel for loading cans into said pockets, an outlet channel spaced from said inlet channel for discharging cans from said can pockets, a casing around said member divided into two separate compartments at each side of said member by said member, means for supplying a cooling fluid under pressure to one of said compartments, means for removing cooling liquid at a restricted rate from the other of said compartments, said rotary member being provided with conduits communicating with each of said can pockets and said casing being provided with conduits at points intermediate said can inlet and outlet channels co-operating with the aforementioned conduits to place each of said can pockets for at least a portion of its travel intermediate said can inlet and outlet channels in communication with both said casing compartments.

THOMAS MARSDEN JONES.